United States Patent
Oobayashi

(10) Patent No.: US 6,920,325 B2
(45) Date of Patent: Jul. 19, 2005

(54) MOBILE COMMUNICATION TERMINAL APPARATUS, CONTROL CIRCUIT, AND HANDOFF CONTROL METHOD

(75) Inventor: Mamiko Oobayashi, Fuchu (JP)

(73) Assignee: Kabushiki Kaisha Toshiba, Tokyo (JP)

(*) Notice: Subject to any disclaimer, the term of this patent is extended or adjusted under 35 U.S.C. 154(b) by 646 days.

(21) Appl. No.: 09/951,737

(22) Filed: Sep. 14, 2001

(65) Prior Publication Data

US 2002/0045449 A1 Apr. 18, 2002

(30) Foreign Application Priority Data

Oct. 2, 2000 (JP) ........................................ 2000-302706

(51) Int. Cl.[7] .............................................. H04Q 7/20
(52) U.S. Cl. ....................... 455/436; 455/437; 455/450; 370/330; 370/331
(58) Field of Search ................................. 455/436, 437, 455/439, 440, 442, 450, 403; 370/330, 331, 333, 342, 441, 335

(56) References Cited

U.S. PATENT DOCUMENTS

| | | | | | |
|---|---|---|---|---|---|
| 5,710,986 | A | * | 1/1998 | Obayashi et al. | 455/553.1 |
| 5,912,885 | A | * | 6/1999 | Mitts et al. | 370/331 |
| 6,256,501 | B1 | * | 7/2001 | Tokuyama et al. | 455/442 |
| 6,721,564 | B1 | * | 4/2004 | Kobayashi | 455/436 |

* cited by examiner

*Primary Examiner*—CongVan Tran
(74) *Attorney, Agent, or Firm*—Oblon, Spivak, McClelland, Maier & Neustadt, P.C.

(57) ABSTRACT

A method for determining whether or not there is a message of the same type as that of a new request message in the request messages waiting for retransmission or transmission, when a handoff request message waiting for retransmission or transmission exists and a new request message is generated. As a result of the determination, when there is the same type of message, a content of the handoff request message waiting for the retransmission or the transmission is updated to a content of the new generated handoff request message.

20 Claims, 12 Drawing Sheets

MOBILE COMMUNICATION TERMINAL APPARATUS, CONTROL CIRCUIT, AND HANDOFF CONTROL METHOD

CROSS-REFERENCE TO RELATED APPLICATIONS

This application is based upon and claims the benefit of priority from the prior Japanese Patent Application No. 2000-302706, filed Oct. 2, 2000, the entire contents of which are incorporated herein by reference.

BACKGROUND OF THE INVENTION

1. Field of the Invention

The present invention relates to a mobile communication terminal apparatus having a function of requiring, for example, handoff of a base station, a control circuit of the apparatus, and a handoff control method in a cellular mobile communication system.

2. Description of the Related Art

In recent years, cellular mobile communication systems have rapidly spread. In the cellular mobile communication system, a plurality of base stations are scattered/located in a service area and these base stations form respective radio zones called cells. Moreover, the mobile communication terminal apparatus is connected to a base station of the radio zone in which the terminal apparatus exists over a radio channel, and the base station is connected to the terminal apparatus of a communication destination via a communication network. This realizes communication among the terminal apparatuses.

Additionally, in this type of system, a message is exchanged between the mobile communication terminal apparatus and the base station via the radio channel during waiting or communicating, so that desired control is executed. In this case, a request message which needs to be securely transmitted to the communication destination requires acknowledgment. To realize the acknowledgment, the base station having received the request message adds a specified number included in the received request message to a response message of acknowledgment, and returns the response message to the mobile communication terminal apparatus as a transmitter. The mobile communication terminal apparatus having transmitted the request message retransmits the request message at a constant time interval, until the response message of acknowledgment can be received. On receiving the response message of acknowledgment, a procedure of retransmitting the request message is ended.

Moreover, the mobile communication terminal apparatus can transmit a plurality of request messages in the same period, and wait for a response of acknowledgment. However, an upper-limit value of the number of request messages which can be transmitted in the same period is determined. Therefore, when the number of transmitted request messages reaches the upper-limit value, and a new request message requiring the acknowledgment response is generated, the new request message is set to a transmitting waiting state until reception of the acknowledgment response to any one of the plurality of transmitted request messages.

The aforementioned message transmission control procedure will be described by means of an example for executing handoff in a system in which a code division multiple access (CDMA) method is employed.

The CDMA mobile communication terminal apparatus measures a reception level of a pilot signal transmitted from the base station which is establishing synchronization during waiting or communicating. Moreover, the respective reception levels of the pilot signals transmitted from a plurality of base stations (neighboring base stations) located around the base station which is establishing the synchronization are also measured. A strength of reception-level is represented by a ratio (Ec/Io) of a whole reception energy (Io) of the pilot signal after inverse diffusion to an energy (Ec) of the pilot signal arriving from the base station as a measurement object. Moreover, when the reception level of the pilot signal arriving from the peripheral base station has a strength of a predetermined level or more strength, the following determinations are performed. In one determination, it is determined whether or not a strength $(Ec/Io)_{PNa2}$ of the reception level of a pilot signal PNa2 arriving from the base station establishing the synchronization is less than a value designated by the base station. In the other determination, it is determined whether or not a strength $(Ec/Io)_{other}$ of the reception level of each pilot signal arriving from another base station is more than another value designated by the base station. Moreover, when answers to these determinations are both affirmative, a handoff request message called a pilot strength measurement message (PSMM) is generated and transmitted to the base station establishing the synchronization. In this handoff request message, the reception level of the pilot signal arriving from the base station which is establishing the synchronization, and the reception levels of the respective pilot signals arriving from the respective neighboring base stations are inserted.

On the other hand, on receiving the handoff request message from the mobile communication terminal apparatus, the base station determines a base station as a handoff destination based on the reception level inserted in the message. Moreover, a notice of a name of the base station as the determined handoff destination is transmitted to the mobile communication terminal apparatus which requires handoff. On receiving the notice, the mobile communication terminal apparatus first returns the response message indicating the acknowledgment to the base station. Subsequently, the base station as a synchronization destination is switched in response to the notices. A handoff processing of the mobile communication terminal apparatus is performed in this manner.

When a plurality of handoff requests are generated, the mobile communication terminal apparatus generates handoff request messages for the respective handoff requests, and use separate sequence numbers (SEQNo) to transmit these messages to the base station. Moreover, the apparatus waits for the acknowledgment response to each handoff request message from the base station. Subsequently, with respect to the message to which the response of acknowledgment is not returned in a fixed time, transmission of the handoff request message is repeated according to a predetermined access sequence by a designated number of times (e.g., nine times at maximum). FIG. 12 shows one example of the sequence. In FIG. 12, (SEQ1(1)) indicates a first transmission with a sequence number 1, and (SEQ1(2)) indicates a second transmission with the sequence number 1. Other sequence numbers are similarly displayed.

Moreover, the mobile communication terminal apparatus can transmit a plurality of handoff request messages in the same period. However, an upper limit of the number of messages which can be transmitted in the same period is defined. Therefore, when the number of handoff request messages being transmitted reaches the upper-limit value, and another new handoff request message is generated, the new handoff request message is set to the transmission standby state until reception of the acknowledgment response to any one of the handoff request messages being transmitted.

Additionally, in the conventional message retransmission procedure, each message is repeatedly retransmitted while a message content of start of transmission is held as it is. Therefore, when the number of retransmissions increases, the message content having reached the base station already becomes old in some cases. Particularly, when the mobile communication terminal apparatus moves at a high speed, a position of the mobile communication terminal apparatus of a time at which the reception level from each base station is measured, and a position of the mobile communication terminal apparatus of a time at which the handoff request message actually reaches the base station largely change. Therefore, a difference between the notified measured value and the actual measured value increases. In this case, the base station determines the handoff destination in accordance with the old measured value which is different from the actual measured value. Therefore, there is a possibility that appropriate handoff is not performed.

Furthermore, when the number of messages waiting for the acknowledgment response reaches the upper-limit value, subsequently generated messages are set to the transmission standby state. Therefore, much time is taken from when the transmission standby state is canceled until the message is transmitted. Also in this case, the content of the message having reached the base station already becomes old in many cases, and as a result, handoff failure easily occurs.

BRIEF SUMMARY OF THE INVENTION

For an object of the present invention, even when message retransmission control or transmission standby control is executed, a message including a latest content can constantly be transmitted to a base station. Another object of the present invention is to provide a mobile communication terminal apparatus in which reliability of the control is enhanced, a control circuit of the apparatus, and a handoff control method.

According to an aspect of the present invention, there is provided a mobile communication terminal apparatus, connectable to a base station over a radio channel, for selectively generating a plurality of types of message for requiring a predetermined processing of the base station, and transmitting the generated message to the base station. Moreover, the transmitted message is set to a retransmission standby state, and it is monitored whether or not an acknowledgment response arrives from the base station within a predetermined period from a timing of transmission of the message. Furthermore, if the acknowledgment response does not come from the base station within the predetermined period, the message set to the retransmission standby state is retransmitted at least once. Additionally, if the new message is generated within the predetermined period a content of the message set to the retransmission standby state is updated to the content of the new message.

Moreover, the mobile communication terminal apparatus according to the present invention also includes the following function. That is, it is determined whether or not a condition necessary for transmission is satisfied during transmission of the generated message. If the transmission condition is determined to be satisfied, the generated message is transmitted to the base station. On the other hand, it is determined that the transmission condition is not satisfied, and then the generated message is set to the transmission standby state. Moreover, if there is a message set to the transmission standby state and a new message is generated, the content of the message set to the transmission standby state is updated to the content of the new message.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION (First Embodiment)

Figure 1:
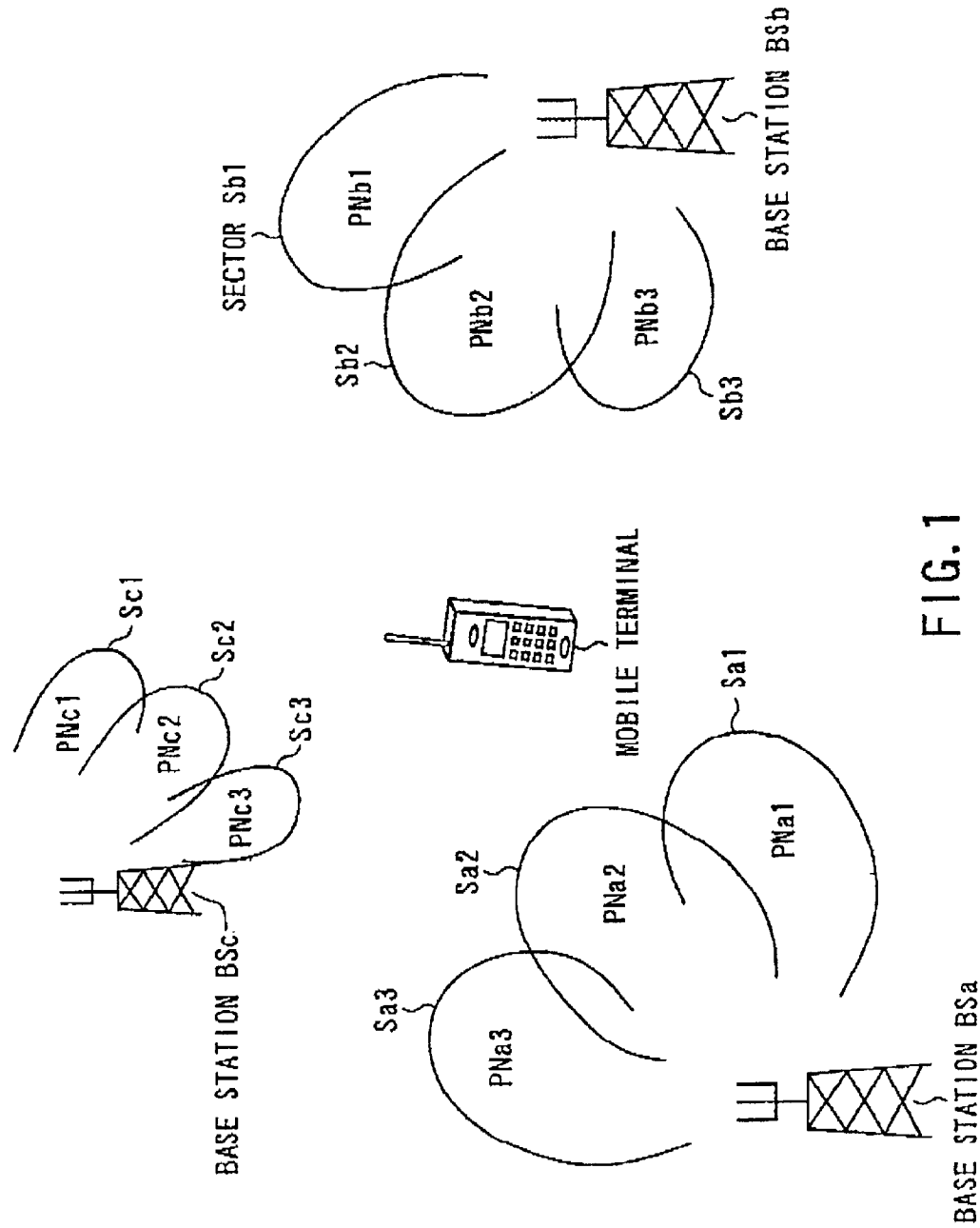
FIG. 1 is a schematic constitution diagram showing a CDMA mobile communication system according to a first embodiment of a cellular mobile communication system according to the present invention.

FIG. 1 is a schematic constitution diagram of a CDMA mobile communication system according to a first embodiment of a cellular mobile communication system according to the present invention.

In a service area of the system, a plurality of base stations BSa, BSb, BSc, (only three stations are shown in FIG. 1) are scattered/located. These base Stations BSa, BSb, BSc, . . . broadcast pilot channels PNa1 to PNa3, PNb1 to PNb3, PNc1 to PNc3 using spread codes whose offset values differ with respective sectors Sa1 to Sa3, Sb1 to Sb3, Sc1 to Sc3, respectively. Additionally, a pseudo noise code and orthogonal code are used together as the spread code. For example, a Walsh sequence and Orthogonal Gold sequence are used as the orthogonal code. A reason why the orthogonal code is used is that orthogonality among the channels is enhanced and interference is further inhibited.

A mobile terminal MS establishes synchronization with respect to any one of the pilot channels PNa1 to PNa3, PNb1 to PNb3, PNc1 to PNc3 broadcast by the base stations BSa, BSb, BSc, . . . . To perform communication with a satisfactory quality, it is necessary to constantly establish the synchronization with respect to the pilot channel having a satisfactory reception quality. Therefore, handoff is performed during waiting in the mobile terminal MS.

In the handoff, the mobile terminal MS periodically compares the reception quality of the pilot channel which is establishing the synchronization with reception qualities of a plurality of other pilot channels with which the synchronization is prospectively established. Subsequently, the satisfactory pilot channel whose reception quality is not less than a predetermined level as compared with the pilot channel establishing the synchronization is found in a plurality of other pilot channels with which the synchronization is prospectively established, In this case, a synchronization establishment object is switched to the found pilot channel.

Figure 2:
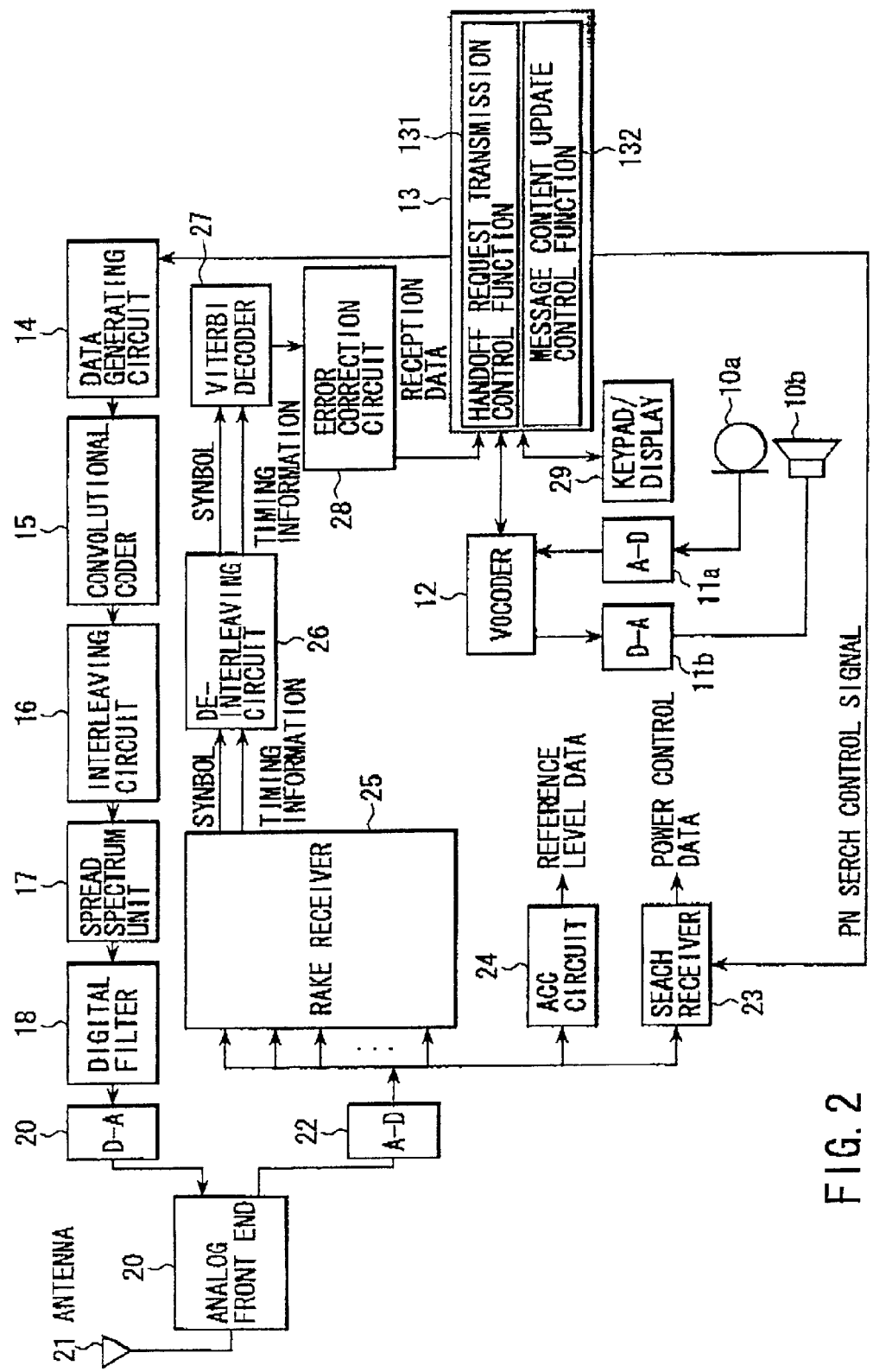
FIG. 2 is a circuit block diagram showing a constitution of a CDMA mobile communication terminal apparatus for use in the system shown in FIG. 1.

FIG. 2 is a circuit block diagram showing a constitution of the mobile terminal MS according to the first embodiment.

In FIG. 2, a transmission speech signal of a speaker outputted from a microphone 10a is converted to a digital signal by an analog-digital converter (A-D) 11a, and inputted to a voice coder-decoder (hereinafter referred to as a vocoder) 12. The vocoder 12 codes the speech signal by a multi rate speech coding system. For example, one rate is selected from four coding rates 9600 bps, 4800 bps, 2400 bps, 1200 bps, and the input digital speech signal is coded by the selected coding rate. The coding rate is indicated via a rate control signal from a microprocessor (MPU) 13.

The microprocessor (MPU) 13 adds a control signal, and the like to the coded digital speech signal outputted from the vocoder 12, and thereby generates transmission data. After an error detection code is added to the transmission data by a data generating circuit 14, the data is coded by a convolutional coder 15, and further subjected to a processing for interleave by an interleaving circuit 16. Subsequently, the transmission data outputted from the interleaving circuit 16 is subjected to spectrum spread by the spread code by a spread spectrum unit 17.

An unnecessary frequency component is removed from the spectrum spread transmission signal by a digital filter 18, and the signal is converted to an analog signal by a digital-analog converter (D-A) 19. Subsequently, the analog transmission signal is converted up at a predetermined radio frequency by an analog front-end 20, amplified in power at a predetermined transmission power level, and transmitted, for example, to the base station via an antenna 21.

On the other hand, a radio signal received by the antenna 21 is amplified by a low-noise amplifier in the analog front-end 20, and converted down at an intermediate frequency or a base-band frequency. Subsequently, the reception signal outputted from the analog front-end 20 is converted to the digital signal at a predetermined sampling period by an analog-digital converter (A-D) 22, and inputted to a search receiver 23, automatic gain control (AGC) circuit 24 and RAKE receiver 25.

The RAKE receiver 25 has a plurality of (e.g., four) finger circuits, and a symbol combiner in which phases of output signals of these finger circuits are matched and symbols are combined. Each finger circuit subjects the reception signal of one path allotted by the microprocessor 13 to inverse spectrum spread, and the reception signal of the path is separated from the radio signal and reproduced.

The search receiver 23 searches a PN code of the pilot channel broadcast by the base station, and captures offset. The receiver basically has the same constitution as that of the finger circuit. Power control data obtained by the search operation of the PN code is taken into the microprocessor 13.

A demodulation symbol outputted from the RAKE receiver 25 is inputted to a de-interleaving circuit 26 together with timing information, and subjected to a de-interleave processing by the de-interleaving circuit 26. Subsequently, the de-interleaved demodulation symbol is Viterbi-decoded in a Viterbi decoder 27. Furthermore, the Viterbi-decoded demodulation symbol is subjected to an error correction decoding processing by an error correction circuit 28, and resulting reception data is inputted to the microprocessor 13. The inputted reception data is separated into speech data and control data by the microprocessor 13. The speech data is converted to the analog signal by a digital-analog converter (D-A) 11b, and enlarged voice output is emitted from a speaker 10b.

Additionally, a keypad/display 29 is located for a user to input and set dial data, control data, and the like and to display various information regarding an operation state of the mobile terminal MS. An operation of the keypad/display 29 is controlled by the microprocessor 13.

Moreover, the microprocessor 13 has a handoff request transmission control function 131 and message content update control function 132 as new control functions according to the present invention.

A memory (not shown) is included in the microprocessor 13, and program stored in the memory is executed by the microprocessor 13, so that the control functions are realized. The handoff control program may be stored beforehand in ROM or another memory, but may be copied from a storage medium and stored during assembling of a product or after use start.

Examples of the storage medium include memories such as a ROM including EEPROM and RAM, floppy disk, hard disk, optical disks such as CD-ROM disk and DVD disk, memory card, and another storage medium which can store other programs. Moreover, the handoff control program may be downloaded onto the mobile terminal MS from the Internet or another computer network, or sites located on other networks, and stored in the memory.

In the handoff request transmission control function 131, a reception strength of each pilot channel broadcast by the base station which is establishing tho synchronization, and a reception strength of each pilot channel broadcast by a neighboring base station as a prospective synchronization established object are measured, respectively. Moreover, the necessity of handoff is determined based on a measured value. When the necessity of the handoff is determined, a request message (PSMM) including the measured values of the reception strengths of the respective pilot channels is generated. Subsequently, a sequence number is used to transmit the PSMM to the base station which is establishing the synchronization. The sequence number is selected from unused sequence numbers among a plurality of prepared sequence numbers.

Moreover, after transmission of the PSMM, it is monitored whether or not the response message of the acknowledgment is returned from the base station within a given time. Subsequently, when the message is not returned, the sequence number used for transmitting the PSMM is used to retransmit the PSMM. Thereafter, the same sequence number is used to repeat the retransmission of the PSMM until the response message of the acknowledgment is returned from the base station. Additionally, the number of repetitions is set to nine, under the IS-95 standard.

Furthermore, it is assumed that a new handoff request message is generated in a transmission state of a plurality of PSMMs in the same period. In this case, it is determined whether or not the number of PSMMs being transmitted reaches the upper-limit value. Subsequently, when the number does not reach the upper-limit value, the newly generated PSMM is transmitted. On the other hand, with the upper-limit value, the new handoff request message is set to the transmission standby state, until the acknowledgment to any one of the PSMMs waiting for acknowledgment response is received.

In the message content update control function 132, while the handoff request message in the retransmission standby state or the handoff request message set to the transmission standby state exists, generation of the new request message is monitored. Moreover, with the generation of the new request message, it is determined whether or not the new request message is of the same type as that of the handoff request message in the retransmission standby state or the transmission standby state. Furthermore, when the message is of the same type, that is, when the new request message is the handoff request message, the content of the handoff request message in the retransmission standby state or the transmission standby state is updated to obtain the content of the new handoff request message.

An operation of the mobile terminal MS constituted as described above will next be described.

It is now assumed that the mobile terminal MS having the established synchronization with respect to the pilot channel PNa2 transmitted by the base station BSa has moved in a direction of the base station BSb.

Figure 3:
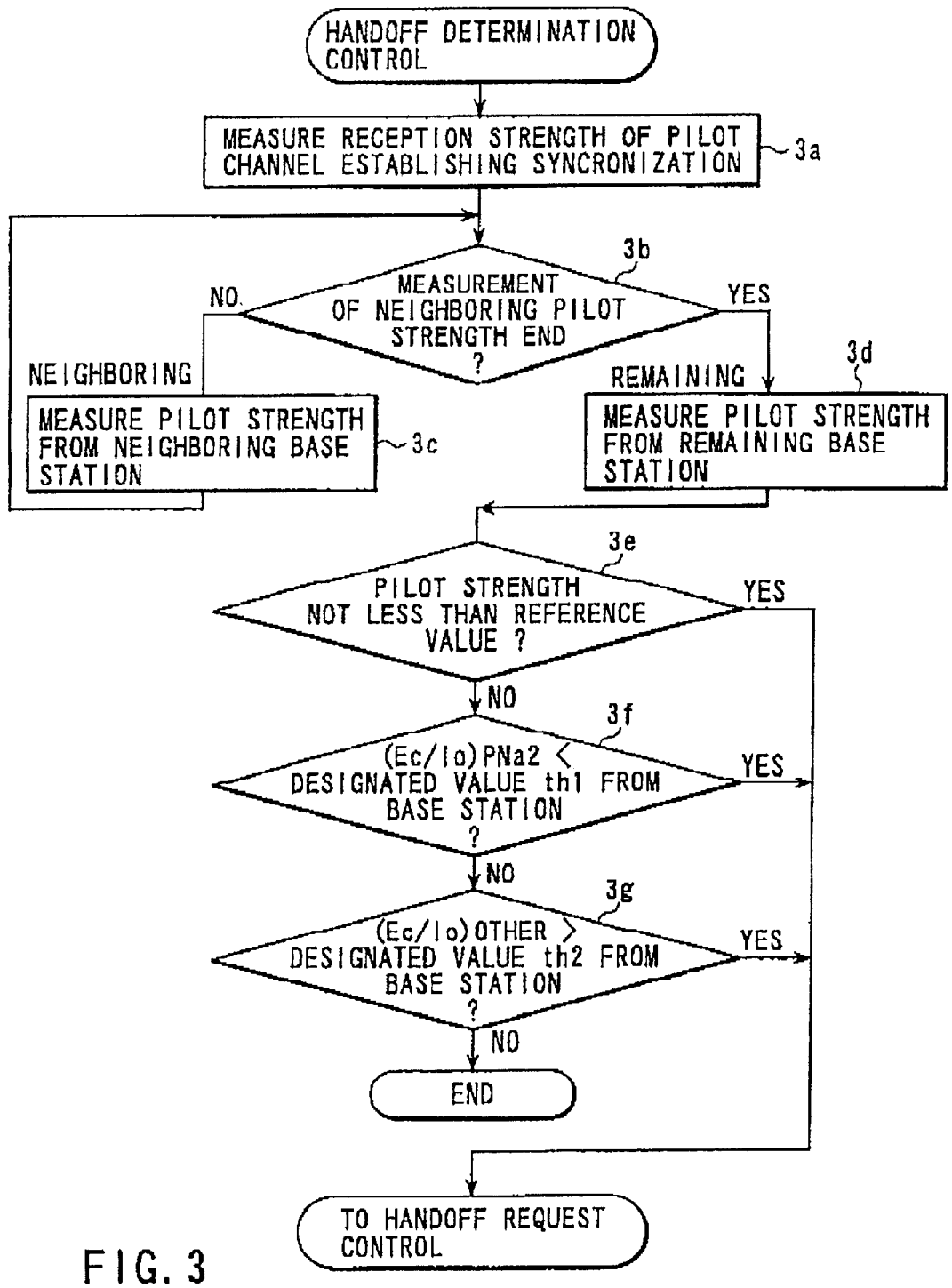
FIG. 3 is a flowchart showing a procedure of handoff determination control executed in the mobile communication terminal apparatus shown in FIG. 2, and a content of a control.

In this case, the mobile terminal MS determines the necessity of the handoff as follows. FIG. 3 is a flowchart showing a control procedure and control content.

That is, first in step 3a, the mobile terminal MS measures a reception strength $(Ec/Io)_{PNa2}$ of the pilot channel PNa2 which is establishing the synchronization. Moreover, it is determined in step 3b whether or not measurement of the reception strength of each pilot channel broadcast by neighboring base station BSb, BSc is ended. Subsequently, when the measurement is not ended, the pilot channel PNa establishing the synchronization successively receives the pilot channels of the neighboring base stations BSb, BSc and measures the reception strengths in accordance with a neighbor list message notified from the base station BSa. The neighbor list message includes an identification number of a PN code for use by a plurality of neighboring base stations.

On ending measurement of received electric field strengths from the neighboring base stations BSb, BSc, next in step 3d the reception strength of the pilot channel from a remaining base station is measured. The remaining base station is obtained by excluding the base station establishing the synchronization and the neighboring base station from all the base stations which can be identified by the PN code. The mobile terminal MS does not necessarily need to measure the reception strengths of the pilot channels transmitted by all the remaining base stations, and may measure only some of the reception strengths.

On ending the aforementioned series of measurement, the mobile terminal MS determines in the next step 3e whether or not there is a pilot channel having a measured value (Ec/Io) of the reception strength equal to or more than a reference value among the pilot channels from the neighboring base station and remaining base station having the reception strengths measured. Subsequently, the pilot channel whose measured value is not less than the reference value is found, and the processing then shifts to handoff request control.

On the other hand, the pilot channel whose measured value of the reception strength is not less than the reference value is not found in the step 3e, and the processing then shifts to step 3f. Moreover, when a reception strength $(EC/IO)_{PNa2}$ of the pilot channel PNa2 establishing the synchronization is less than a threshold value th1 designated by the base station, the processing also shifts to the handoff request control. Furthermore, when a reception strength $(EC/Io)_{other}$ of each pilot channel from the remaining base station Is more than another threshold value th2 designated by the base station, the processing also shifts to the handoff request control from step 3g. Additionally, in other cases, the handoff request control is not performed.

Figure 4:
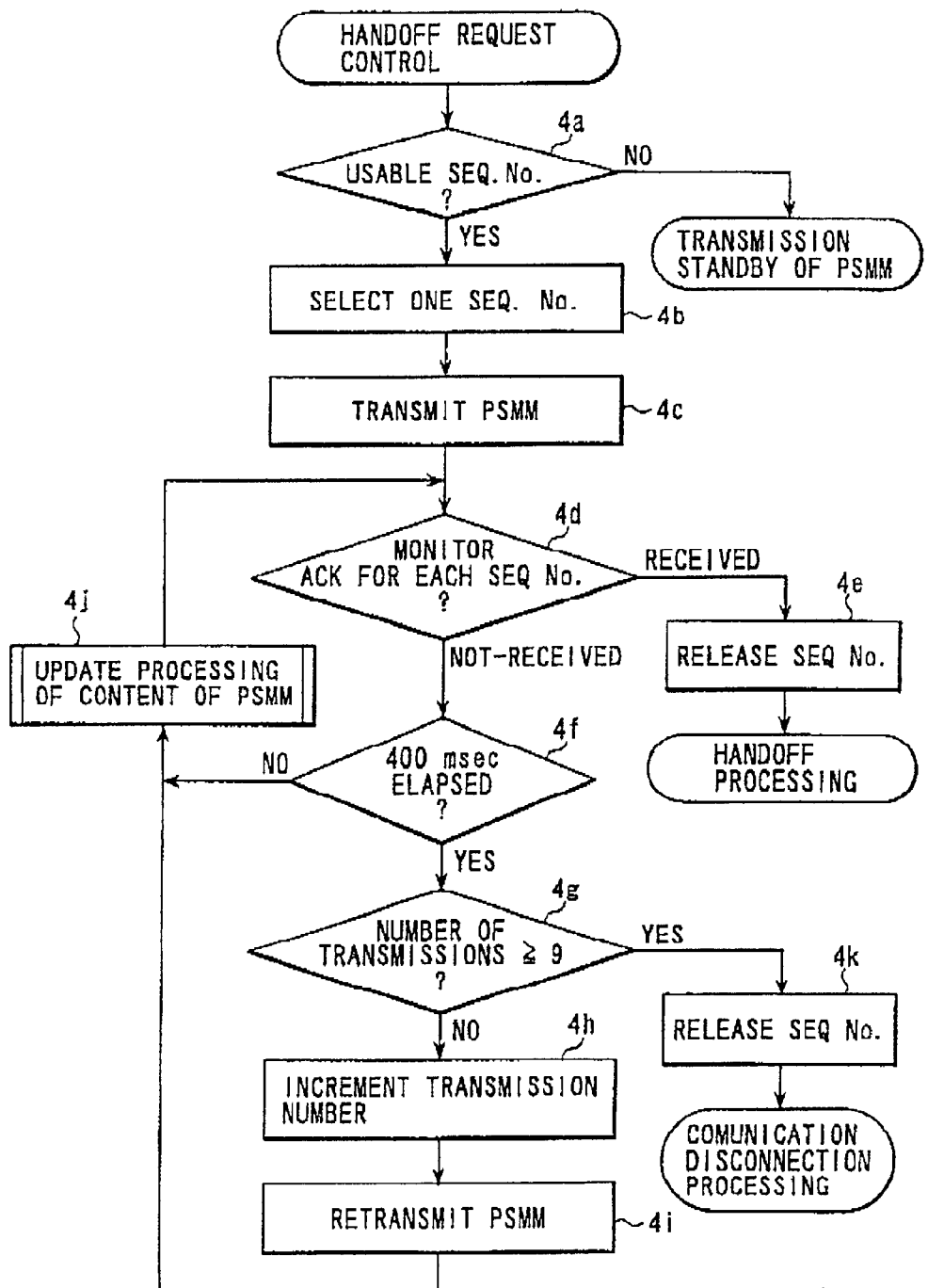
FIG. 4 is a flowchart showing a procedure of handoff request control in the first embodiment of the present invention, and a content of the control.
Figure 5:
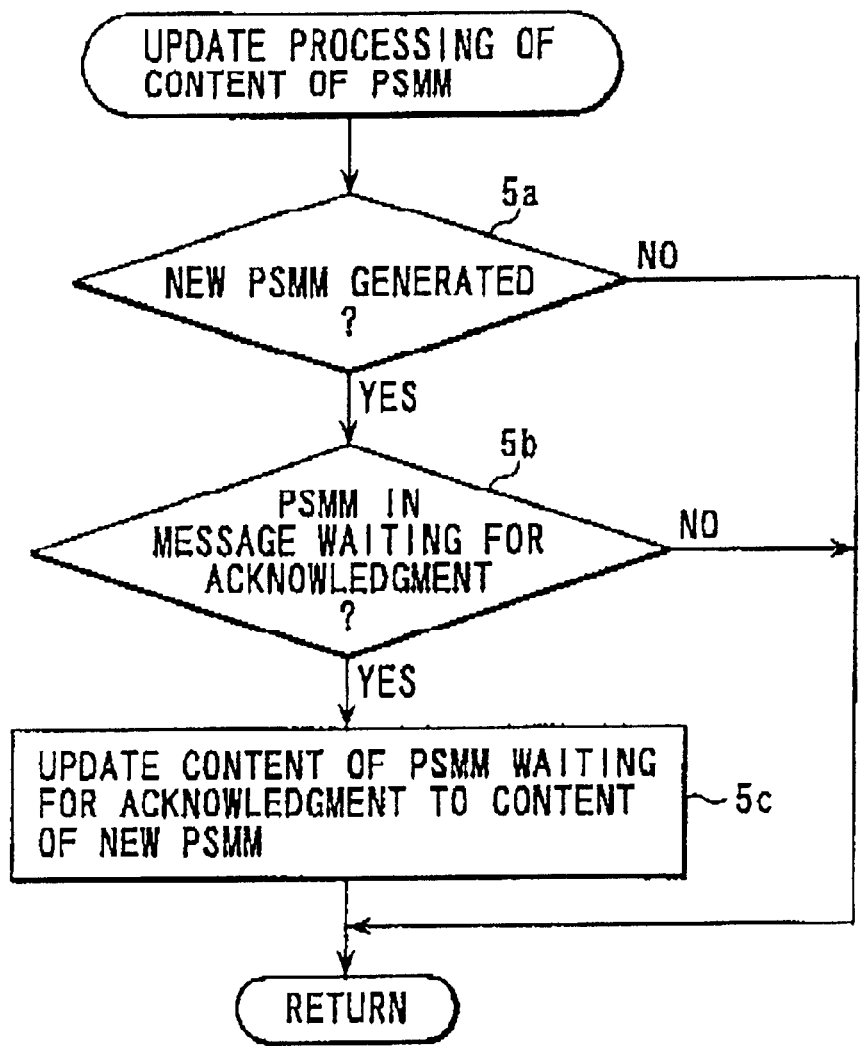
FIG. 5 is a flowchart showing a procedure of a content update processing of a handoff request message in the first embodiment of the present invention, and a content of the processing.
Figure 6:
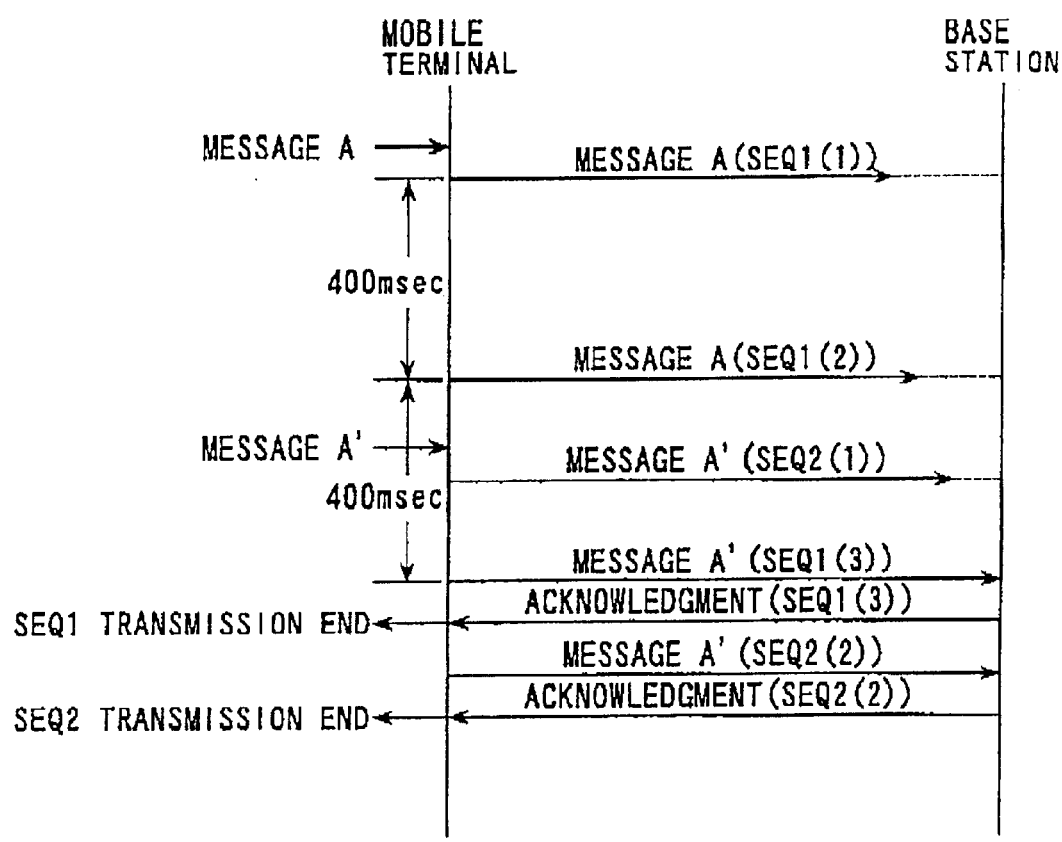
FIG. 6 is a sequence diagram showing a message transmission procedure in the first embodiment of the present invention.

Moreover, on shifting to the handoff request control, the mobile terminal MS executes the handoff request control as follows. FIG. 4 is a flowchart showing a control procedure and control content, and FIG. 5 is a flowchart showing a procedure of a content update processing of the handoff request message (PSMM) and a content of the processing. Moreover, FIG. 6 shows a message transmission sequence between the mobile terminal MS and the base station BS.

That is, the mobile terminal MS determines first in step 4a whether or not there is a usable sequence number (SEQNo). Here, the usable sequence number means an unused sequence number among the remaining sequence numbers excluding one sequence number prepared beforehand to transmit the request message other than the handoff request message. As a result of the determination, when there is no usable sequence number, the processing shifts to transmission standby control of the handoff request message.

On the other hand, when there is the usable sequence number, one usable sequence number, for example (SEQ1) is selected in step 4b. Subsequently, in step 4c, a pilot strength measurement message (PSMM) is generated as a message for requiring the handoff. In the PSMM, the measured value of the reception strength of the pilot channel PNa2 establishing the synchronization, obtained in the handoff determination control, and the measured values of the reception strengths of all the pilot channels from the neighboring base station and remaining base station are inserted. Subsequently, the selected sequence number (SEQ1) is used to transmit the generated handoff request message (referred to as message A in FIG. 6) to the base station BSa which is establishing the synchronization. Additionally, in FIG. 6, (1) of (SEQ(1)) indicates a first transmission.

When the message A (SEQ(1)) is transmitted, the mobile terminal MS starts a timer. Next in step 4f, time-out (400 msec) of the timer is monitored, and in step 4d, returning of acknowledgment response message (ACK) from the base station BSa is monitored. When the acknowledgment response message is returned from the base station BSa before the time-out of the timer, the sequence number (SEQ1) is released in step 4e, and the processing shifts to a handoff processing.

Additionally, in the handoff processing, first arrival of a handoff direction message (HOM) is waited for from the base station BSa. On receiving the handoff direction message, a handoff completion message (HCM) is returned. Thereafter, a processing is performed to establish the synchronization with respect to the pilot channel as a handoff destination indicated by the handoff direction message.

Moreover, it is assumed that a state of a radio transmission path with the base station BSa is deteriorated by an influence of movement of the mobile terminal MS or an influence of multi-path, and therefore the message A (SEQ(1)) does not reach the base station BSa, or the response message of the acknowledgment cannot be received from the base station BSa.

Then, the mobile terminal MS confirms the time-out of the timer in the step 4f, shifts to step 4g, and determines in the step 4g whether or not the message A (SEQ1) can be retransmitted. For example, when the number of transmissions of the handoff request message is a predetermined number, for example, nine or less, the retransmission is determined to be possible. Subsequently, when the retransmission is possible, in step 4h a count value of a counter for counting the number of transmissions of the sequence number (SEQ1) is incremented to (SEQ1(2)). Subsequently, the terminal generates the message A (SEQ1(2)) having the same content as that of the message A (SEQ1(1)) in step 4i, and transmits the message A (SEQ1(2)) to the base station BSa which is establishing the synchronization.

Thereafter, every time the mobile terminal MS uses the sequence number (SEQ1) to retransmit the message A, the terminal monitors the returning of the response message of acknowledgment from the base station BSa in the step 4d. Subsequently, when the response message of acknowledgment cannot be received within the term (40 msec) before the time-out of the timer, retransmission control of the message A by the steps 4d to 4i is repeated as described above. At the time the repetition of the retransmission control is repeated a predetermined number of times, for example, nine times, the repetition ends. Additionally, at the end of the retransmission procedure, the sequence number (SEQ1) is released in step 4k.

Additionally, the mobile terminal MS of the first embodiment performs the update processing of the content of the message by step 4j in the period of monitor of the acknowledgment response message after transmission or retransmission of the message A.

That is, in step 5a shown in FIG. 5, the mobile terminal MS monitors whether or not a new request message is generated by the handoff determination control (FIG. 3). Moreover, with generation of the new request message in this state, it is determined in step 5b whether or not there is the same type of message A as that of the new request message in the handoff request message waiting for the acknowledgment response. As a result of the determination, when there is the same type of message A, that is, when the new request message is a handoff request message A', the content of the handoff request message A waiting for the acknowledgment response is updated to the content of the newly generated handoff request message A' in step 5c.

Therefore, when the handoff request message A (SEQ1 (2)) is retransmitted after the time-out of the acknowledgment response waiting state, the handoff request message A', (SEQ1(3)) having the content updated as shown in FIG. 6 is retransmitted.

In the aforementioned first embodiment, with presence of the request message waiting for retransmission or transmission, it is monitored whether or not a new request message is generated. Moreover, on generation of the new request message, it is determined whether or not there is the same type of message as the new request message in the request message waiting for retransmission or transmission. As a result of the determination, when there is the same type of message, that is, when the newly generated request message is the handoff request message A', and there is the same type of the handoff request message A in the request messages waiting for the retransmission or transmission, the content of the handoff request message A waiting for retransmission or transmission is updated to the content of the newly generated handoff request message A'.

Therefore, every time the new handoff request message is generated in the acknowledgment response standby period, the content of the handoff request message A waiting for the acknowledgment response is updated to the content of the newly generated handoff request message A'. Therefore, while the message retransmission procedure defined in the standard is observed, the handoff request message having the latest content can be transmitted to the base station BS. As a result, handoff success ratio during high-speed movement can be enhanced.

(Second Embodiment)

In a second embodiment of the present invention, in addition to the retransmission control of the handoff request message, additional transmission control of the handoff request message is provided. In the additional transmission control, a plurality of usable sequence numbers are newly selected in the retransmission procedure of the handoff request message. Subsequently, the newly selected plurality of sequence numbers are used to additionally transmit the message having the same content as that of the handoff request message being retransmitted at a time interval shorter than the retransmission interval.

Moreover, in the second embodiment, generation of the same type of handoff request message having a new content as the aforementioned message is monitored in the handoff determination control during execution of the additional transmission control and retransmission control. Furthermore, when the same type of handoff request message having the new content is generated, the content of the message to be retransmitted or additionally transmitted is updated to the new content of the message.

Figure 7:
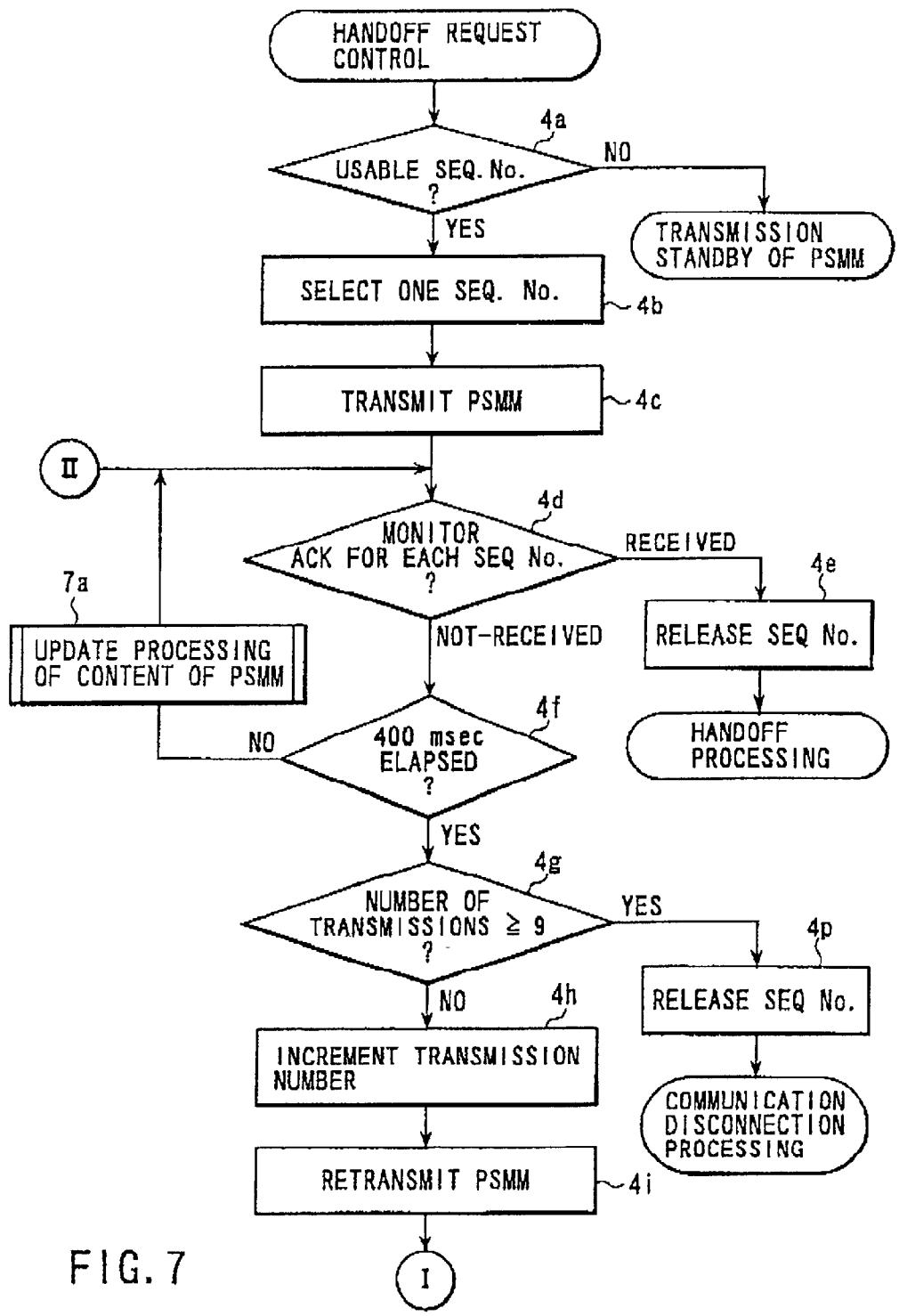
FIG. 7 is a flowchart showing a procedure of a former half of the handoff request control in a second embodiment of the present invention, and a content of the control.
Figure 8:
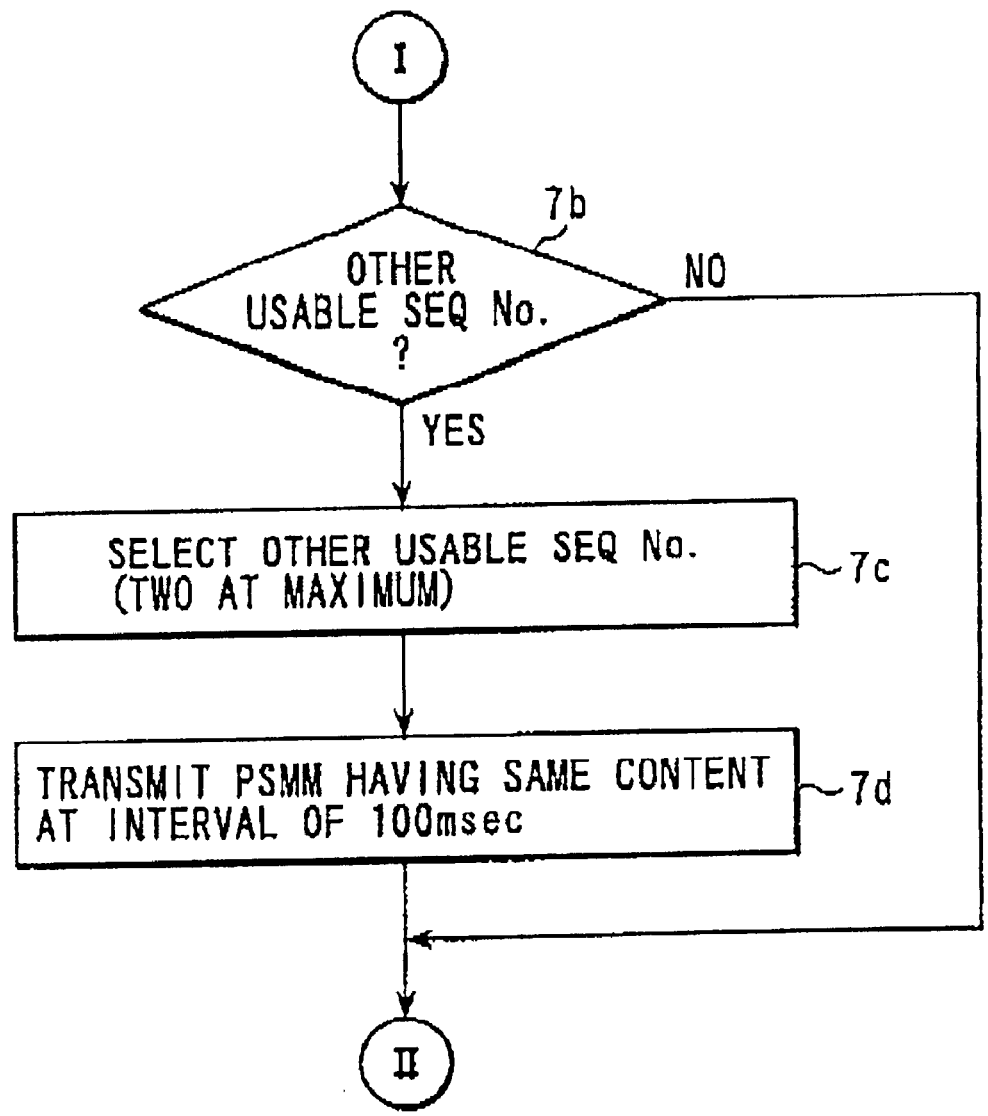
FIG. 8 is a flowchart showing a procedure of a latter half of the handoff request control in the second embodiment of the present invention, and a content of the control.
Figure 9:
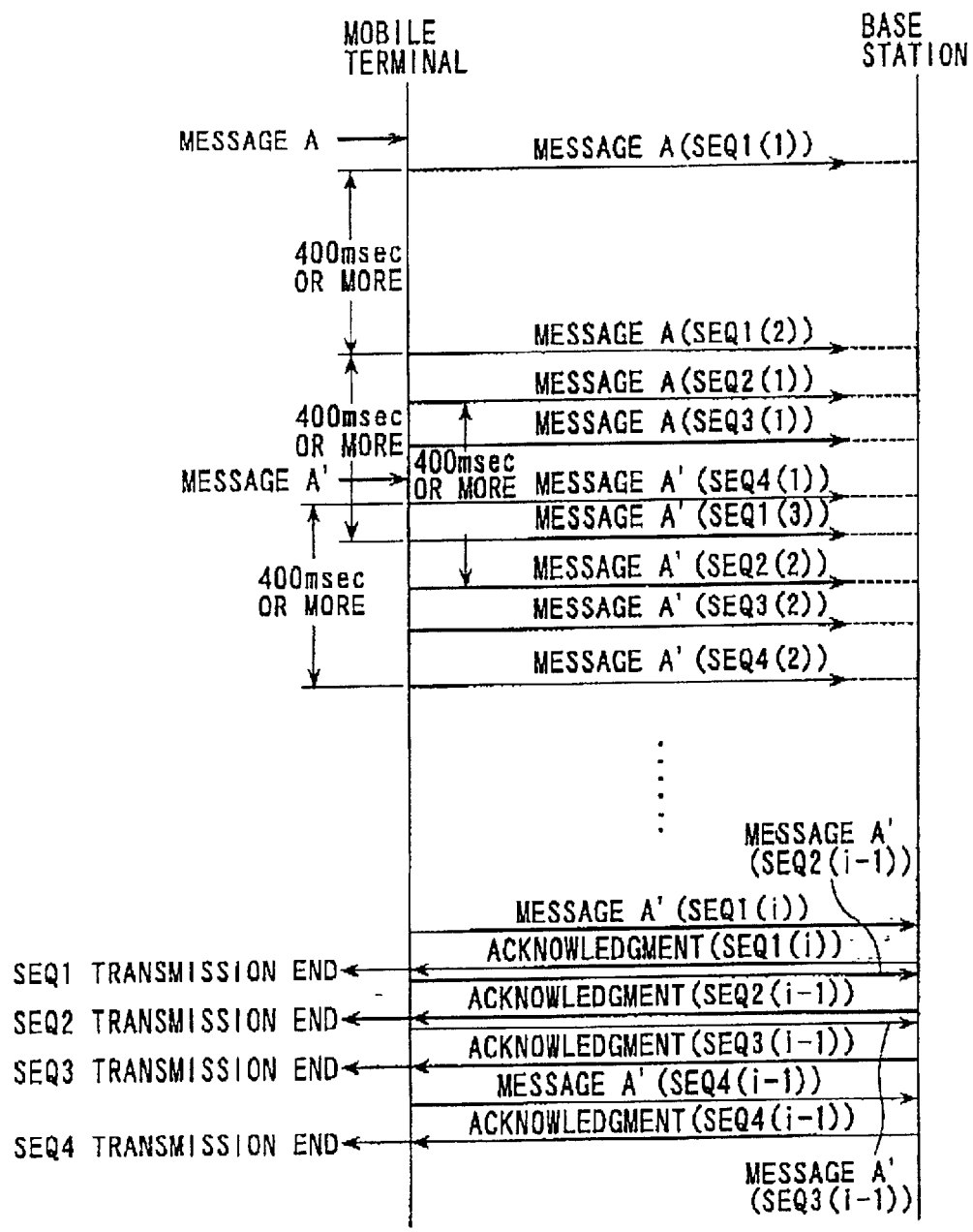
FIG. 9 is a sequence diagram showing the message transmission procedure in the second embodiment of the present invention.

FIGS. 7 and 8 are flowcharts showing the procedure of the handoff request control and the content of the control according to the second embodiment, and FIG. 9 is a sequence diagram showing the message transmission procedure performed between the mobile terminal MS and the base station BS. Additionally, in FIG. 7, the same part as that of FIG. 4 is denoted with the same reference numeral, and detailed description is omitted.

When the retransmission control of the handoff request message starts, the mobile terminal MS of the second embodiment executes control to additionally transmit the handoff request message having the same content.

That is, when the mobile terminal MS retransmits the message A (SEQ1(2)) in the step 4i, the terminal shifts to step 7b shown in FIG. 9, and determines presence/absence of the usable sequence number. As a result of the determination, when the usable sequence number is, for example, only one sequence number reserved for transmission of another message, additional transmission is determined to be impossible. Subsequently, the processing returns to the retransmission control of the message A using the sequence number (SEQ1) by the steps 4d to 4i as it is.

On the other hand, when the usable sequence number remains, a plurality of usable sequence numbers such as SEQ2 and SEQ3 are selected in step 7c. Additionally, when there is only one usable sequence number, the one sequence number is selected. Subsequently, the selected plurality of sequence numbers (SEQ2) and (SEQ3) are used to transmit the message A having the same content as that of the message A to the base station BSa in step 7d. Additionally, in this case, respective transmission timings are set such that the message A (SEQ2(1)) and message A (SEQ3(1)) are transmitted 100 msec and 200 msec after transmission of the message A (SEQ1(2)). That is, the additional transmission timing of the message A is set so that the interval is 100 msec shorter than the retransmission interval of 400 msec.

Thereafter, when the mobile terminal MS retransmits the message A (SEQ1(3)), the terminal uses the sequence numbers (SEQ2), (SEQ3) to successively and additionally transmit the message A (SEQ2(2)) and message A ((SEQ3(2)) having the same content at an interval of 100 msec. Similarly, when the terminal retransmits the message A (SEQ1(4)), the terminal uses the sequence numbers (SEQ2), (SEQ3) to successively and additionally transmit the message A (SEQ2(3)) and message A ((SEQ3(3)) having the same content at the interval of 100 msec. This state is shown in FIG. 9.

Moreover, the mobile terminal MS executes a content update processing with respect to not only the message A transmitted using the sequence number (SEQ1) but also the message A having the same content, additionally transmitted using the separate sequence numbers (SEQ2), (SEQ3) in step 7a.

That is, as shown in FIG. 3, the mobile terminal MS monitors in the step 5a whether or not the new handoff request message is generated by the handoff determination control. It is now assumed that the new handoff request message is generated in this state. Then, it is determined in the step 5b whether or not there is the same type of message as the new handoff request message exists in the handoff request messages waiting for the response of acknowledgment. Moreover, it is now assumed that the message A transmitted using the sequence number (SEQ1) and the message A additionally transmitted using other sequence numbers (SEQ2), (SEQ3) are of the same type of message as the newly generated handoff request message A'. Then, in the step 5c, the content of each handoff request message A waiting for the acknowledgment response is updated to the content of the newly generated handoff request message A'.

Therefore, when each handoff request message A is next retransmitted because of the time-out of the acknowledgment response standby state of the message, as shown in FIG. 9, the handoff request message A' ((SEQ1(3)), message A' ((SEQ2(2)), and message A' (SEQ3(2)) having the updated contents are retransmitted, respectively.

Therefore, according to the second embodiment, with respect to not only the message A transmitted using the (SEQ1) but also the respective messages A having the same content and additionally transmitted using the other sequence numbers (SEQ2), and (SEQ3), when the new handoff request message A' being of the same type as the message A and having the new content is generated in the handoff determination control during the retransmission control, the content of the message A is updated to the content A' of the newly generate message A'. Therefore, the base station can be notified of the newest reception level measured value of course in the first transmitted message and even in the additionally transmitted message. Therefore, quick and optimum handoff control can be executed.

(Third Embodiment)

A third embodiment of the present invention relates to a mobile communication terminal apparatus having a function of setting a new message to the transmission standby state, when the number of messages waiting for the acknowledgment response reaches the preset upper-limit number and the new message is generated in the state. With the presence of the message set to the transmission standby state and further the generation of the new message, it is determined whether the new message is of the same type as the message waiting for transmission and has a different content. As a result of the determination, when the new message is of the same type as the message waiting for transmission and has the different content, the content of the message waiting for the transmission is updated to the content of the newly generated message.

Figure 10:
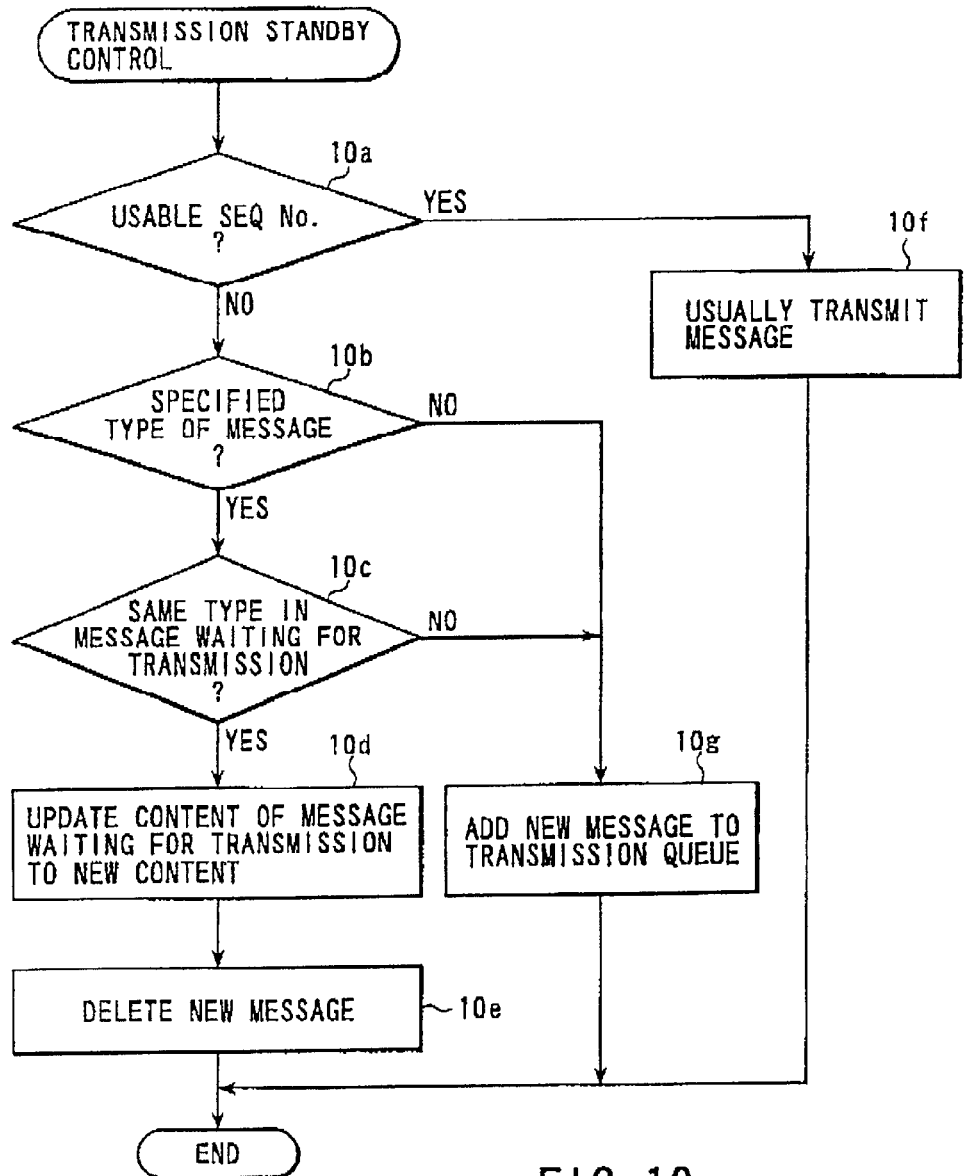
FIG. 10 is a flowchart showing a procedure of a transmission standby control in a third embodiment of the present invention, and a content of the control.
Figure 11:
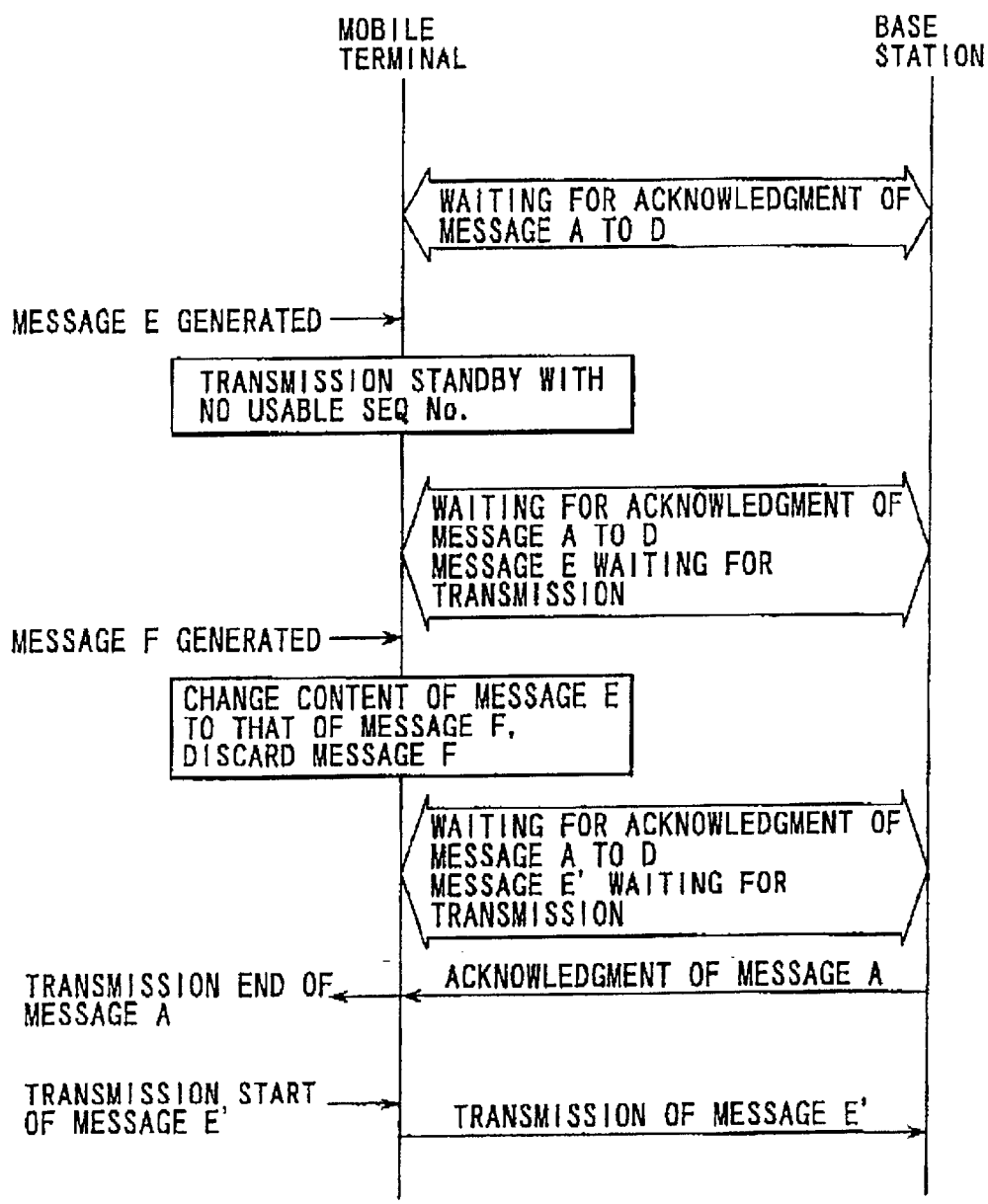
FIG. 11 is a sequence diagram showing the procedure of the transmission standby control in the third embodiment of the present invention.
Figure 12:
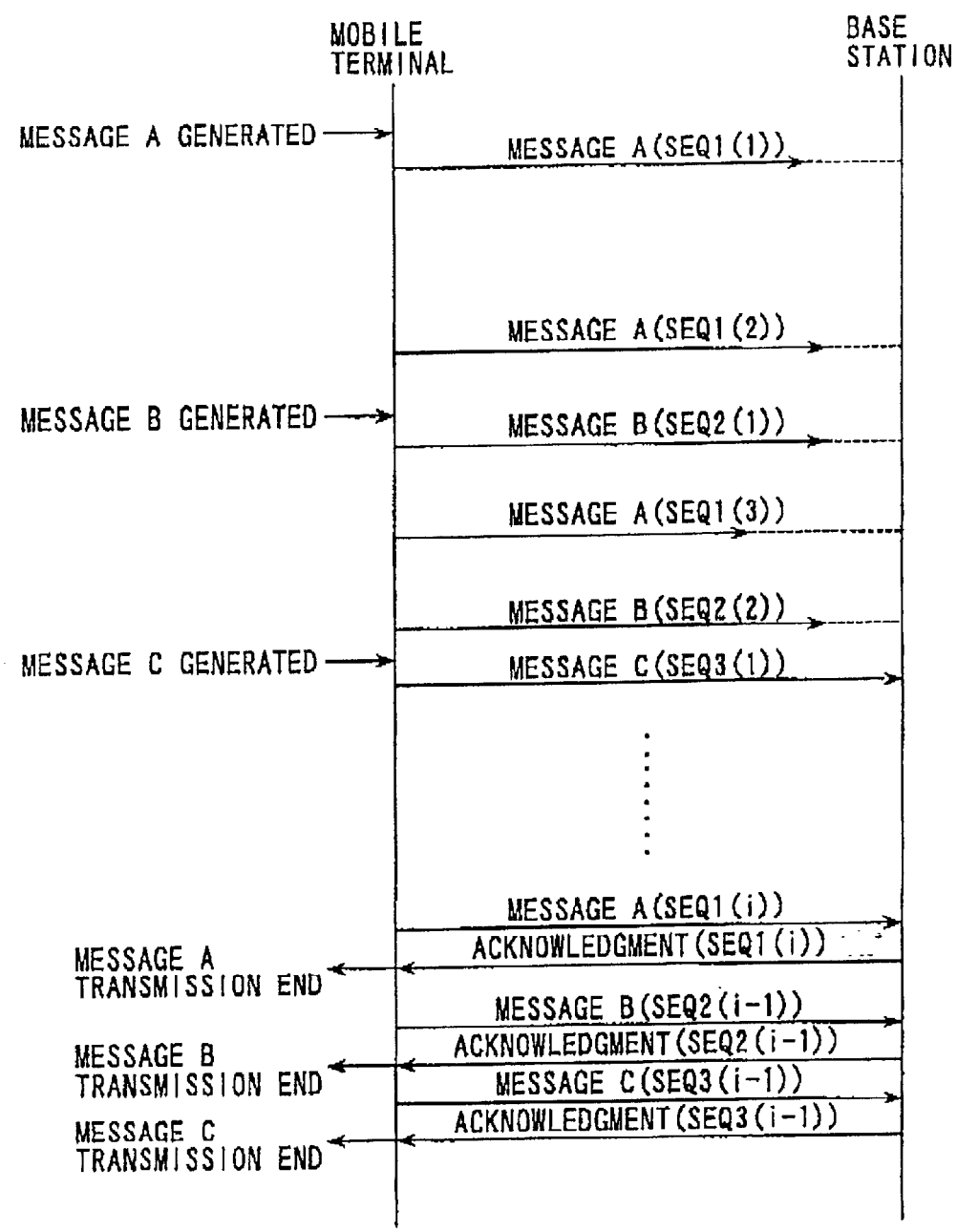
FIG. 12 is a sequence diagram showing a conventional transmission procedure of a handoff request message.

FIG. 10 is a flowchart showing a procedure of a transmission standby control and a content of the control of the mobile terminal MS according to a third embodiment, and FIG. 11 shows a message transmission sequence between the mobile terminal MS and the base station BS.

When the mobile terminal MS transmits or retransmits the handoff request message during transmission as described in the first and second embodiments, the terminal is in the state waiting for the acknowledgment response. With the generation of the new message in this state, it is first determined in step 10a whether or not there is a usable sequence number. As a result of the determination, when there is the usable sequence number, in step 10f one usable sequence number is selected and the new message is transmitted to the base station.

On the other hand, with no vacant sequence number, it is first determined in step 10b whether or not the new message is a specified type of message. As a result of the determination, when the message is not of the specified type, the new message is added to a transmission queue in step 10g. On the other hand, with the specified type of message, it is determined in step 10c whether or not there is the same type of message in the messages in the transmission queue. Subsequently, when there is not the same type of message, the new message is added to the transmission queue as it is in the step 10g.

Additionally, it is assumed that there is the same type of message as the new message in the messages in the transmission queue. Then, the mobile terminal MS updates the content of the message in the transmission queue to the content of the new message in step 10d. Subsequently, the new message is finally discarded in step 10e.

For example, as shown in FIG. 11, while the messages A to D are waiting for the acknowledgment, the handoff request message E as one of the specified types of messages is newly generated. Assuming that the number of sequence numbers prepared for transmitting the specified type of message is four, there is no vacant sequence number, and therefore the mobile terminal MS adds the new message E to the transmission queue.

Moreover, it is assumed that the same type of message as the message E waiting for the transmission, that is, the handoff request message F is newly generated. Then, the mobile terminal MS changes the content of the message E waiting for the transmission to the content of the new message F. That is, the reception level measured value inserted in the message E is updated to the latest reception level measured value inserted in the message F. Subsequently, when the updating of the message content is ended, the new message F is discarded. Therefore, after the updating of the message content, a message E' having the content updated to indicate the latest reception level measured value is set in the transmission queue.

When any one of the messages A to D waiting for the acknowledgment response is acknowledged and the sequence number is released, the message E' waiting for transmission is transmitted to the base station using the sequence number. Therefore, the base station is notified of the latest reception level measured value by the message E'.

As described above, in the third embodiment for example, while the handoff request message is set in the transmission waiting state, the same type of new handoff request message is generated. In this case, instead of adding the new handoff request message to the transmission queue as it is, the content E of the handoff request message previously set in the transmission queue is updated to the content F of the new handoff request message.

Therefore, under a situation in which radio environment is deteriorated and messages are frequently generated, the base station can be notified of the latest reception level measured value. Therefore, it is possible to notify the base station of the new reception level measured value and execute a correct handoff processing.

Moreover, in the third embodiment, when the content E of the message in the transmission queue is updated to the content F of the new message, the new message F is discarded and is not added to the transmission queue. In this manner, the number of messages waiting for the transmission can be reduced, and the transmission timing of the message waiting for the transmission to the base station can be set in an early stage.

(Other Embodiments)

In the first to third embodiments, the CDMA mobile communication system has been described as the example. However, this is not limited, and the system in which the mobile terminal has a function of transmitting the handoff request can similarly be applied to a system in which time division multiple access (TDMA) methods such as personal digital cellular (PDC) and personal handyphone system (PHS) are employed.

Furthermore, the example in which the mobile terminal transmits the handoff request message to the base station has been described in the first to third embodiments. However, the present invention can be applied to transmission of other types of messages as long as the message requires the acknowledgment response.

Moreover, communication link connection control, communication control and handoff control function for transmission and reception may be realized by a control circuit constituted of gate array and other integrated circuits instead of the microprocessor.

Additionally, the type and circuit constitution of the mobile terminal, handoff determination control, handoff request control and update processing control, procedure and content of the transmission standby control, procedure and content of the message additional transmission control, and the like can also be modified and implemented variously within the scope of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A mobile communication terminal apparatus comprising;

measuring means for measuring respective reception qualities of radio signals transmitted from a first base station and a second base station located in a periphery of the first base station, while synchronization is established with the first base station;

handoff determining means for determining whether or not handoff is necessary based on a measurement result of said measuring means;

message generating means for generating a handoff request message if the handoff determining means determines the handoff to be necessary;

message transmitting means for transmitting the handoff request message generated by said message generating means to said first base station;

response monitor means for setting said transmitted handoff request message to a retransmission standby state, and monitoring whether or not an acknowledgment response arrives from said first base station within a predetermined period from a transmission time of the handoff request message;

message retransmitting means for retransmitting the handoff request message set to the retransmission standby state, when the acknowledgment response does not arrive from the first base station within said predetermined period; and message update means for updating a content of the handoff request message set to said retransmission standby state to a content of a new handoff request message, if said message generating means generates the new handoff request message within said predetermined period.

2. A mobile communication terminal apparatus comprising:

measuring means for measuring respective reception qualities of radio signals transmitted from a first base station and a second base station located in a periphery of the first base station, while synchronization is established with the first base station;

handoff determining means for determining whether or not handoff is necessary based on a measurement result of said measuring means;

message generating means for generating a handoff request message if the handoff determining means determines the handoff to be necessary;

transmission condition determining means for determining whether or not a condition necessary for transmitting said generated handoff request message is satisfied;

message transmitting means for transmitting said generated handoff request message to said first base station, if said transmission condition determining means determines the transmission condition to be satisfied;

transmission standby control means for setting said generated handoff request message to a transmission standby state, if said transmission condition determining means determines the transmission condition not to be satisfied; and message update means for updating a content of the handoff request message set to said transmission standby state to a content of a new handoff request message, if the handoff request message set to said transmission standby state exists and said message generating means generates the new handoff request message.

3. The mobile communication terminal apparatus according to claim 2, wherein said message update means updates the content of the handoff request message set to said transmission standby state to the content of said new handoff request message, and discards the new handoff request message.

4. A control circuit comprising:

measuring means for measuring respective reception qualities of radio signals transmitted from a first base station and a second base station located in a periphery of the first base station, while synchronization is established with the first base station;

handoff determining means for determining whether or not handoff is necessary based on a measurement result of said measuring means;

message generating means for generating a handoff request message if said handoff determining means determines the handoff to be necessary;

message transmission instructing means for instructing a transmission circuit to transmit the handoff request message generated by said message generating means to said first base station;

response monitor means for setting said transmitted handoff request message to a retransmission standby state, and monitoring whether or not an acknowledgment response arrives from said first base station within a predetermined period from a transmission time of the handoff request message;

message retransmission instructing means for instructing said transmission circuit to retransmit the handoff request message set to said retransmission standby state, when the acknowledgment response does not arrive from the first base station within said predetermined period; and message update means for updating a content of the handoff request message set to said retransmission standby state to a content of a new handoff request message, if said message generating means generates the new handoff request message within said predetermined period.

5. A control circuit comprising:

measuring means for measuring respective reception qualities of radio signals transmitted from a first base station and a second base station located in a periphery of the first base station, while synchronization is established with the first base station;

handoff determining means for determining whether or not handoff is necessary based on a measurement result of said measuring means;

message generating means for generating a handoff request message if the handoff determining means determines the handoff to be necessary;

transmission condition determining means for determining whether or not a condition necessary for transmitting said generated handoff request message is satisfied;

message transmission instructing means for instructing a transmission circuit to transmit said generated handoff request message to said first base station, if said transmission condition determining means determines the transmission condition to be satisfied;

transmission standby control means for setting said generated handoff request message to a transmission standby state, if said transmission condition determining means determines the transmission condition not to be satisfied; and message update means for updating a content of the handoff request message set to said transmission standby state to a content of a new handoff request message, if the handoff request message set to said transmission standby state exists and said message generating means generates the new handoff request message.

6. The control circuit according to claim 5, wherein said message update means updates the content of the handoff request message set to said transmission standby state to the content of said new handoff request message, and discards the new handoff request message.

7. A handoff control method comprising steps of:

measuring respective reception qualities of radio signals transmitted from a first base station and a second base station located in a periphery of the first base station, while synchronization is established with the first base station;

determining whether or not handoff is necessary based on a measurement result of said reception quality;

generating a handoff request message if said handoff is determined to be necessary;

transmitting said generated handoff request message to said first base station;

setting said transmitted handoff request message to a retransmission standby state, and monitoring whether or not an acknowledgment response arrives from said first base station within a predetermined period from a transmission time of the handoff request message;

retransmitting the handoff request message set to said retransmission standby state, if the acknowledgment response does not arrive from the first base station within said predetermined period; and updating a content of the handoff request message set to said retransmission standby state to a content of a new handoff request message, if the new handoff request message is generated within said predetermined period.

8. A handoff control method comprising steps of;

measuring respective reception qualities of radio signals transmitted from a first base station and a second base station located in a periphery of the first base station, while synchronization is established with the first base station;

determining whether or not handoff is necessary based on a measurement result of said reception quality;

generating a handoff request message if the handoff is determined to be necessary;

determining whether or not a condition necessary for transmitting said generated handoff request message is satisfied;

transmitting said generated handoff request message to said first base station, if said transmission condition is determined to be satisfied;

setting said generated handoff request message to a transmission standby state, if said transmission condition is determined not to be satisfied; and updating a content of the handoff request message set to said transmission standby state to a content of a new handoff request message, if the handoff request message set to said transmission standby state exists and the new handoff request message is generated.

9. A mobile communication terminal apparatus connectable to a base station over a radio channel, comprising:

message generating means for generating a message for requiring a predetermined processing of said base station;

message transmitting means for transmitting the message generated by said message generating means to said base station;

response monitor means for setting said transmitted message to a retransmission standby state, and monitoring whether or not an acknowledgment response arrives from said base station within a predetermined period from a transmission time of the message, message retransmitting means for retransmitting the message set to said retransmission standby state, if the acknowledgment response does not arrive from said base station within said predetermined period; and message update means for updating a content of the message set to said retransmission standby state to a content of a new message, if said message generating means generates the new message within said predetermined period.

10. The mobile communication terminal apparatus according to claim 9, wherein said message update means further comprises a function of determining whether or not the new message generated by said message generating means is of the same type as the message set to said retransmission standby state, and updates the content of the message set to the retransmission standby state to the content of the new message, if the messages are of the same type.

11. A mobile communication terminal apparatus connectable to a base station over a radio channel, comprising:

message generating means for generating a message for requiring a predetermined processing of said base station;

transmission condition determining means for determining whether or not a condition necessary for transmitting said generated message is satisfied;

message transmitting means for transmitting said generated message to said base station, if said transmission condition determining means determines the transmission condition to be satisfied;

transmission standby control means for setting said generated message to a transmission standby state, if said transmission condition determining means determines the transmission condition not to be satisfied; and message update means for updating a content of the message set to the transmission standby state to a content of a new message, if the message set to said transmission standby state exists and said message generating means generates the new message.

12. The mobile communication terminal apparatus according to claim 11, wherein said message update means further comprises a function of determining whether or not the new message generated by said message generating means is of a same type as the message set to said transmission standby state, and updates the content of the message set to said transmission standby state to the content of said new message, when the messages are of the same type.

13. The mobile communication terminal apparatus according to claim 11, wherein said message update means updates the content of the message set to said transmission standby state to the content of said new message, and discards the new message.

14. A control circuit included in a mobile communication terminal apparatus connectable to a base station over a radio channel, comprising;

message generating means for generating a message for requiring a predetermined processing of said base station;

message transmission instructing means for instructing a transmission circuit to transmit the message generated by said message generating means to said base station;

response monitor means for setting said transmitted message to a retransmission standby state, and monitoring whether or not an acknowledgment response arrives from said base station within a predetermined period from a transmission time of the message;

message retransmission instructing means for instructing said transmission circuit to retransmit the message set to said retransmission standby state, if the acknowledgment response does not arrive from said base station within said predetermined period; and message update means for updating a content of the message set to said retransmission standby state to a content of a new message, if said message generating means generates the new message within said predetermined period.

15. A control circuit included in a mobile communication terminal apparatus connectable to a base station over a radio channel, comprising:

message generating means for generating a message for requiring a predetermined processing of said base station;

transmission condition determining means for determining whether or not a condition necessary for transmitting said generated message is satisfied;

message transmission instructing means for instructing a transmission circuit to transmit said generated message to said base station, if said transmission condition determining means determines the transmission condition to be satisfied;

transmission standby control means for setting said generated message to a transmission standby state, if said transmission condition determining means determines the transmission condition not to be satisfied; and message update means for updating a content of the message set to said transmission standby state to a content of a new message, if the message set to said transmission standby state exists and said message generating means generates the new message.

16. A method for transmitting a message to a base station from a mobile communication terminal apparatus over a radio channel, comprising steps of:

generating a messages for requiring a predetermined processing of said base station;

transmitting said generated message to said base station;

setting said transmitted message to a retransmission standby state, and monitoring whether or not an acknowledgment response arrives from said base station within a predetermined period from a transmission time of the message;

retransmitting the message set to said retransmission standby state, if the acknowledgment response does not arrive from said base station within said predetermined period; and updating a content of the message set to said retransmission standby state to a content of a new message, if the new message is generated within said predetermined period.

17. A method for transmitting a message to a base station from a mobile communication terminal apparatus over a radio channel, comprising steps of:
generating a message for requiring a predetermined processing of said base station;
determining whether or not a condition necessary for transmitting said generated message is satisfied;
transmitting said generated message to said base station, if said transmission condition is determined to be satisfied;
setting said generated message to a transmission standby state, if said transmission condition is determined not to be satisfied; and
updating a content of the message set to said transmission standby state to a content of a new message, if the message set to said transmission standby state exists and the new message is generated.

18. A mobile communication terminal apparatus connectable to a base station over a radio channel, comprising:
message generating means for generating a first message for requiring a predetermined processing of said base station;
first message transmitting means for transmitting the first message generated by said message generating means to said base station;
response monitor means for setting said transmitted first message to a retransmission standby state, and monitoring whether or not an acknowledgment response arrives from said base station within a predetermined period from a transmission time of the first message;
message retransmitting means for retransmitting the first message set to said retransmission standby state, if the acknowledgment response does not arrive from said base station within said predetermined period;
second message transmitting means for additionally transmitting a second message having the same content as that of said first message to said base station at a timing which is different from a transmission timing and a retransmission timing of said first message within said predetermined period; and
message update means for updating a content of the first message set to said retransmission standby state and a content of said second message to be additionally transmitted to a content of a new first message, if said message generating means generates the new first message within said predetermined period.

19. A control circuit included in a mobile communication terminal apparatus connectable to a base station over a radio channel, comprising:
message generating means for generating a first message for requiring a predetermined processing of said base station;
first message transmission instructing means for instructing a transmission circuit to transmit the first message generated by said message generating means to said base station;
response monitor means for setting said transmitted first message to a retransmission standby state, and monitoring whether or not an acknowledgment response arrives from said base station within a predetermined period from a transmission timing of the first message;
message retransmission instructing means for instructing said transmission circuit to retransmit the first message set to said retransmission standby state, if the acknowledgment response does not arrive from the base station within said predetermined period;
second message transmission instructing means for instructing said transmission circuit to additionally transmit a second message having the same content as that of said first message to said base station at a timing which is different from a transmission timing and a retransmission timing of said first message within said predetermined period; and
message update means for updating a content of the first message set to said retransmission standby state and a content of said second message to be additionally transmitted to a content of a new first message, if said message generating means generates the new first message within said predetermined period.

20. A method for transmitting a message to a base station from a mobile communication terminal apparatus over a radio channel, comprising steps of:
generating a first message for requiring a predetermined processing of said base station;
transmitting said generated first message to said base station;
setting said transmitted first message to a retransmission standby state, and monitoring whether or not an acknowledgment response arrives from said base station within a predetermined period from a transmission timing of the first message;
retransmitting the first message set to said retransmission standby state, if the acknowledgment response does not arrive from the base station within said predetermined period:
additionally transmitting a second message having the same content as that of said first message to said base station at a timing which is different from a transmission timing and a retransmission timing of said first message within said predetermined period; and
updating a content of the first message set to said retransmission standby state and a content of said second message to be additionally transmitted to a content of a new first message, if the new first message is generated within said predetermined period.

* * * * *